United States Patent [19]

Engle

[11] Patent Number: 5,687,019

[45] Date of Patent: Nov. 11, 1997

[54] THIN FILM ADDRESSED ELECTROSTATIC LIGHT VALVE

[76] Inventor: Craig D. Engle, 336 Clire Ave, Griffith, Ind. 46319

[21] Appl. No.: 519,120

[22] Filed: Aug. 24, 1995

Related U.S. Application Data

[63] Continuation-in-part of Ser. No. 955,058, Oct. 1, 1992, Pat. No. 5,488,505.

[51] Int. Cl.$^6$ .................................................. G02B 26/00
[52] U.S. Cl. ............................................................. 359/291
[58] Field of Search ..................................... 359/291, 292

[56] References Cited

U.S. PATENT DOCUMENTS

| | | | |
|---|---|---|---|
| 3,654,606 | 4/1972 | Marlowe et al. | 340/166 |
| 3,798,620 | 3/1974 | Cosentino | 340/173 |
| 4,596,992 | 6/1986 | Hornbeck | 346/76 PH |
| 4,731,610 | 3/1988 | Baron et al. | 340/784 |

OTHER PUBLICATIONS

Engle, Craig D., An Enhanced Electrostatic Shutter Mosaic Modulator, ser. nr. 07/955,058, filing date Oct. 01, 1992.

A. G. Fischer, Design Considerations for a Future Electroluminescent TV panel, IEEE Transactions of Electron Devices, Sep. 1971.

Bernard J. Lechner, et al, Liquid Crystal Matrix Displays, Proceedings of the IEEE vol. 59, No. 11, Nov. 1971.

Paul K, Weimer, Chapter 9, Thin Film Transistors, Field Effect Transistors Physic Technology and Applications, edited by Wallmark and Johnson, Prentice–Hall Sep. 1971.

Charles Feldman, The Future of Thin film Active Devices, Electronics, Jan. 24, 1964.

P. G. LeComber, Present and Future Applications of Amorphous Silicon and its Alloys, Journal of Non–Crystalline Solids 115.

*Primary Examiner*—Bruce Anderson

[57] ABSTRACT

A plurality of first electrodes (18) are affixed to an insulating substrate (12). Overlapping each first electrode (18) is a respective reflective conductor (20). Each reflective conductor (20) is affixed to the substrate (12). Each first electrode (18) is electrically connected to a respective thin film transistor (30) by a feedthrough means (32). Each thin film transistor (30) is formed on the substrate (12). Applied between each first electrode (18) and the respective reflective conductor (20) is a respective potential difference. Varying each respective potential difference varies a separation distance (86) between the electrode (18) and the respective reflective conductor (20) thereby modulating an electromagnetic wavefront incident thereon.

6 Claims, 2 Drawing Sheets

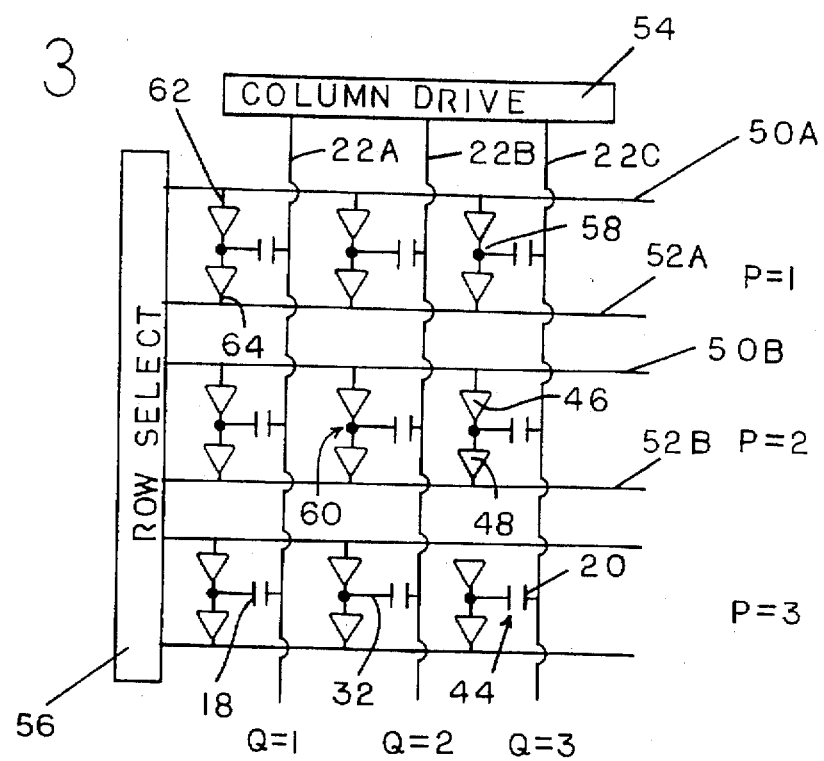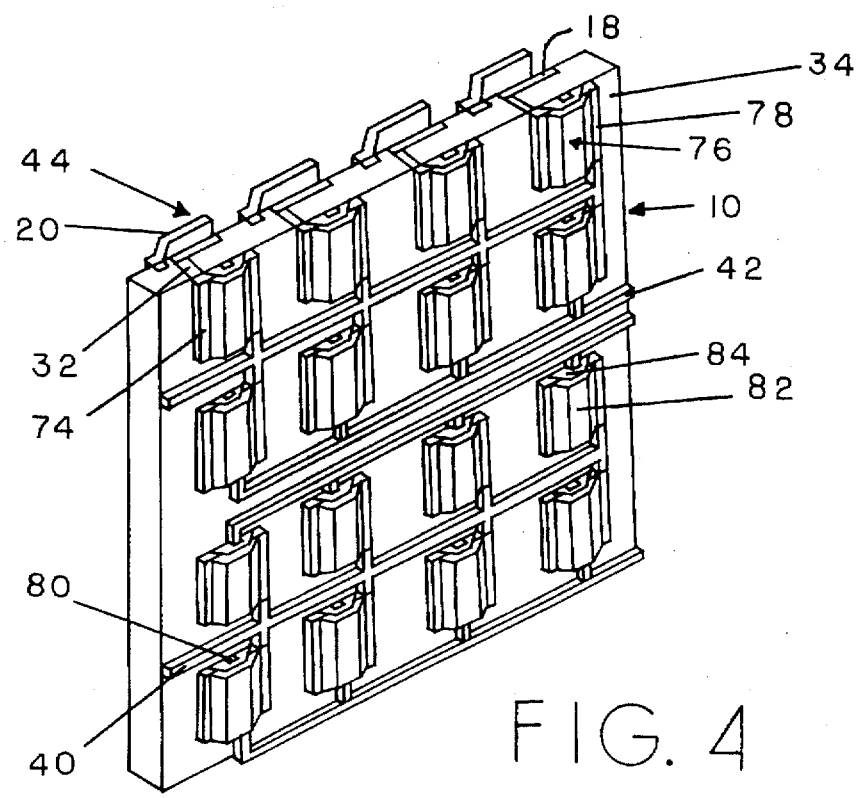

THIN FILM ADDRESSED ELECTROSTATIC LIGHT VALVE

This application is a continuation in part of earlier application U.S. Ser. No. 07/955,058 filed Oct. 1, 1992 of Craig D. Engle for An Enhanced Electrostatic Shutter Mosaic Modulator now U.S. Pat. No. 5,488,505.

BACKGROUND

1. Field of Invention

This invention is related to thin film electronic switching elements utilized to address electrostatic spatial light modulators.

2. Prior Art

As identified in the parent application admitted to Craig D. Engle titled "An Enhanced Electrostatic Shutter Mosaic Modulator" Ser. No. 07/955,058, filing data Oct. 1, 1992, electrostatic spatial light modulators have been plagued by a variety of problems. An electronically addressed membrane light modulator is described in U.S. Pat. No. 3,798,620 to Consentino, Mar. 19, 1974. In U.S. Pat. No. 3,798,620, crossovers are incorporated into the discrete transistor modules which are bonded to the backside of the device. As to be show herein, by suitable utilization of the membrane, requirements for crossovers in the switching array can be eliminated, not just translated as a requirement for another interface component.

In addition, bonding several transistors to the substrate prior to membrane checkout is undesirable; the number of fabrication operations should be reduced prior to membrane checkout. Bonding discrete components to the substrate impedes integration of thin film components and is contrary to thin film component integration. See for instance information in the article titled "Design Considerations for a Future Electroluminescent TV Panel", by A. G. Fischer, IEEE Transactions of Electron Devices, September 1971. Furthermore, as to be shown herein, bonding discrete components to the substrate and requiring each component to accommodate a crossover buss leads to extraneous components.

Accordingly, several objects and advantages of my invention include:

1) To identify matrix addressing configurations which are compatible with electrostatic light modulators.

2) To identify thin film transistor configurations which are utilizable with my invention.

3) To identify the benefits of utilizing a no crossover matrix configuration in electrostatic spatial light modulator configurations.

4) To identify a variety of thin film components which are utilizable with my invention.

Further objects and advantages of my invention will become apparent from a consideration of the drawings and ensuing description of it.

LIST OF FIGURES

In the drawings, closely related figures have the same number but different alphabetic suffixes.

FIG. 3 shows a thin film addressing configuration which utilizes thin film diodes.

FIG. 4 shows an active matrix array configuration which utilizes thin film transistors employing a coplanar electrode configuration.

DESCRIPTION OF INVENTION

Figure 1:
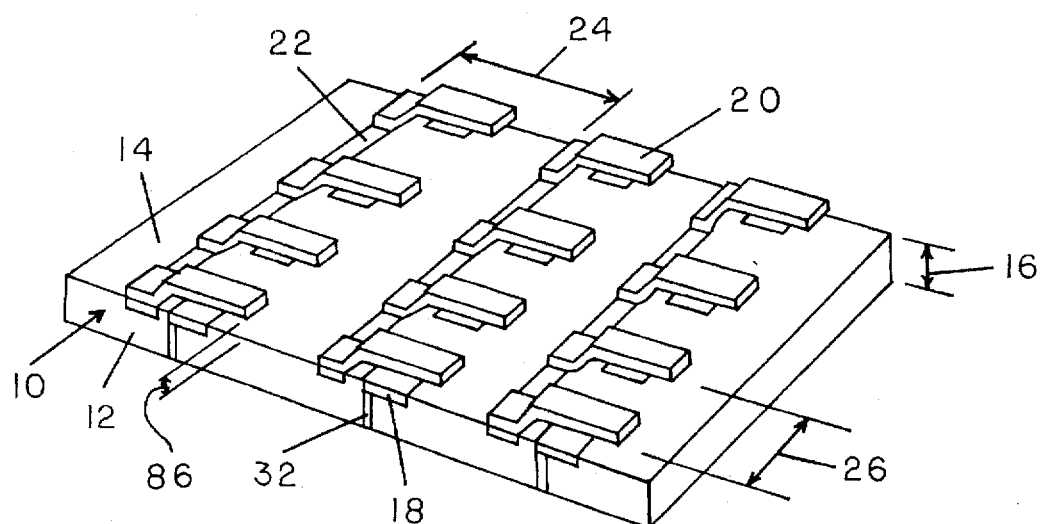
FIG. 1 shows a first surface perspective of an electrostatic spatial light modulator.

FIG. 1 shows an electrostatic spatial light modulator 10. Modulator 10 contains an insulating substrate 12. Substrate 12 contains a first major face 14 and a second major face. The second major face is not visible in this figure. The second major face is essentially parallel to the first major face. Face 14 and the second major face are separated by a substrate thickness 16. Modulator 10 further includes a plurality of first electrodes 18 affixed to face 14. Electrodes 18 are arranged in a matrix of p rows and q columns.

Each first electrode 18 is overlapped by a respective deformable reflective conductor 20. As to be shown herein, several suitable forms exist for conductor 20. Each conductor 20 is affixed to face 14 by a means. Means to affix conductors 20 to face 14 have been provided in the references cited herein. Each electrode 18 and conductor 20 overlapping the electrode 18 are separated by a capacitor thickness 86 when conductor 20 is in an unenergized state. Having conductors 20 overlay first electrodes 18 in a one to one correspondence yields a matrix of p rows and q columns of conductors 20. Every conductor 20 in each column q is electrically connected by a respective column buss 22. Each buss 22 is affixed to substrate 12. Techniques for affixing column busses to the substrate are identified in the references cited herein.

Adjacent busses 22 are separated by a first period 24. Period 24 is perpendicular to thickness 16. Adjacent conductors 20 in each column q are displaced by a second period 26. Second period 26 is perpendicular to period 24 and thickness 16. Each electrode 18 is electrically connected to a drain electrode of a respective thin film transistor by a feedthrough means 32. The thin film transistors are not shown in FIG. 1 for convenience. Electrode structures for use with thin film transistors will be identified herein.

Materials suitable for use as electrodes, busses and/or conductors include Aluminium. Techniques to affix and/or form electrodes, busses and/or conductors on the substrate include vacuum deposition techniques. Such techniques to form components on the substrate are well understood by those knowledgeable in the state of the art. Vacuum techniques include evaporation, sputtering, etc. See for instance information in the book titled Field Effect Transistors, Physic, Technology and Applications edited by Wallmark and Johnson, Prentice-Hall, chapter 9, titled "Thin Film Transistors" by Paul K. Weimer.

Figure 2:
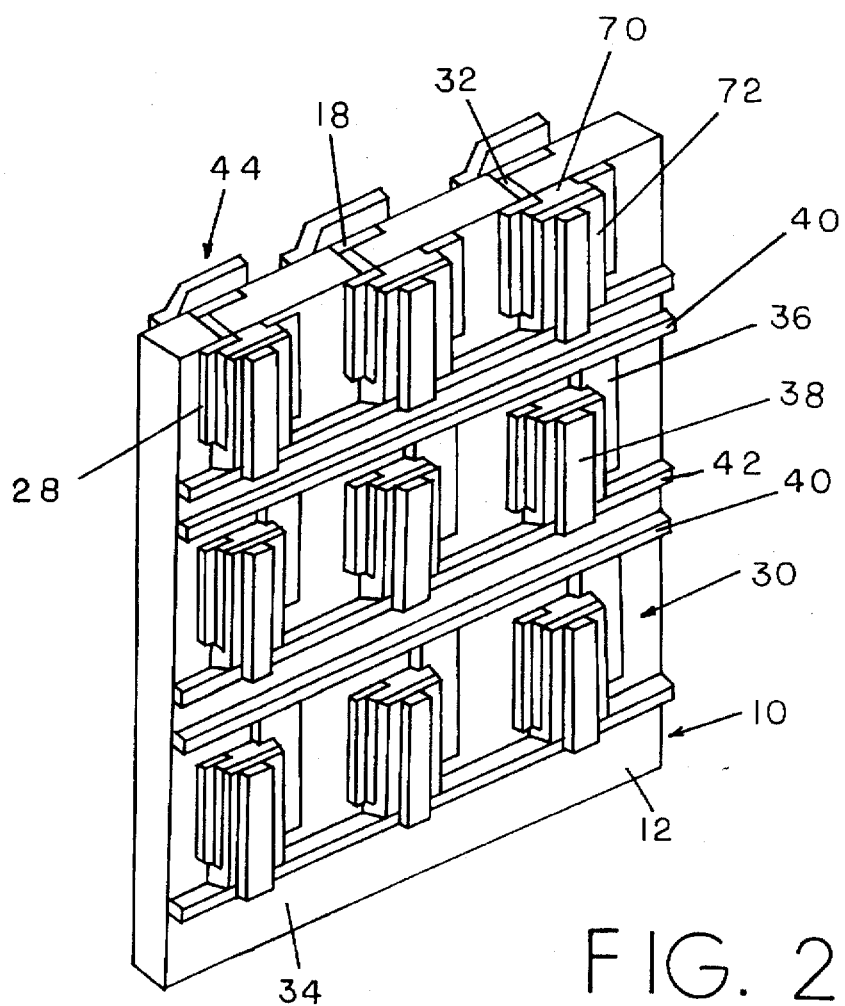
FIG. 2 shows a second surface perspective of an electrostatic spatial light modulator utilizing thin film transistors employing a staggered electrode structure.

FIG. 2 shows an active matrix configuration utilizing a plurality of thin film transistors 30 employing a staggered electrode structure. Substrate 12 of modulator 10 further includes a second major face 34. Each first electrode 18 is electrically connected to a drain electrode 28 of a respective thin film transistor 30 by a feedthrough 32. Each transistor 30 is affixed to face 34 by a means. As well understood by those knowledgeable in the state of the art, thin film transistors are capable of being vacuum deposited on face 34. Vacuum deposition of thin film transistors represents a means to affix and/or form thin film transistors on face 34.

Each first electrode 18 overlaps the respective transistor 30 thereby yielding a matrix of p rows and q columns of transistors 30. Each transistor 30 further includes a source electrode 36 and a gate electrode 38. A plurality of first busses 40 electrically connects every source electrode 36 in each row p to a common potential source. The common potential source is not shown in this figure. Every gate electrode 38 in each row p is electrically connected by a respective second buss 42. The first buss associated with the top row of transistors 30 is not shown in this figure for convenience. Each second buss 42 is parallel to every first buss 40. Having each first buss parallel to every second buss avoids electrical crossover networks in the active switch matrix. As well understood by those knowledgeable in the state of the art, avoiding electrical crossover networks enhances reliability associated with fabricating modulator 10.

Each first electrode 18 and the respective conductor 20 form an electrostatic deformable pixel element 44. A means is provided to control the potential difference of each pixel element 44 so as to deform each respective conductor 20 in accordance with an information bearing signal, thereby modulating a wavefront incident on modulator 10. The wavefront is not shown in this figure.

Potential control means are well understood by those knowledgeable in the state of the art. Each second buss is electrically connected to a row decoder module which applies a control signal to a selected second buss, changing the impedance state of every transistor connected by the selected second buss from a high impedance state to a low impedance state, enabling the potential difference of every pixel element in the selected row to be controlled by the potential difference between the common potential source and the potential applied to the respective column buss. The row decoder could provide a random select capability or a consecutive sequence. Methods of establishing potentials on the respective column busses are well understood by those knowledgeable in the state of the art.

Each transistor 30 further includes a semiconductor material layer 70. Semiconductor materials utilizable with the thin film transistors of my invention includes CdSe. As to be identified herein, alternative switching elements are utilizable with my invention. Layer 70 of each transistor 30 is in contact with substrate 12. Layer 70 is in electrical contact with the drain electrode 28 and the source electrode 36 of a respective thin film transistor 30. Disposed between layer 70 and gate electrode 38 of each transistor 30 is a respective insulating layer 72. The thin film transistors 30 depicted in FIG. 2 are shown in an staggered electrode structure. Information concerning thin film transistors electrode structures is provided in the references cited herein. Materials for use as an insulating layer in my invention are well understood by those knowledgeable in the state of the art. Insulating material layers include Aluminum Oxide. Materials for use as drain, source, gate electrodes, conductors, and column busses includes Aluminum. Substrate material options includes glass.

Alternative electronic switching elements are utilizable with my invention. For instance, it is feasible to affix electronic switching elements to the substrate of my invention by a transfer process involving a thin layer of semiconductor material which contains the plurality of electronic switching elements. The thin layer of semiconductor material containing the switching elements is affixable to the backside of the substrate. Transfer techniques and materials which are utilizable with such transfer techniques are well understood by those knowledgeable in the state of the art. For instance, thin layers of silicon semiconductor material containing a plurality of electronic switching elements is utilizable as electronic switching elements in my invention. Accordingly, any switching element which includes a semiconductor layer in contact with the substrate of my invention is utilizable in my invention. Due to the flexibility of my invention, several matrix configurations are enhanced by my invention.

Additional addressing configurations which are utilizable in my invention includes the configurations described in the article "Liquid Crystal Matrix Displays" by Bernard J. Lechner et at, Proceedings of the IEEE, Vol. 59, No. 11, November 1971. Additional information concerning some of the configurations discussed in that article include U.S. Pat. No. 3,654,606 to Frank Jerome Marlowe et al, March 1972, and U.S. Pat. No. 4,731,610 to Baron et al, Mar. 15, 1988. As described in U.S. Pat. No. 4,731,610, U.S. Pat. No. 3,654,606 has several drawbacks when utilized with liquid crystal modulators, However, as to be identified herein, configurations similar to U.S. Pat. No. 3,654,606 have several desirable attributes when employed in my invention. In a pulse width mode of operation, several of the "thresholding" and "nonlinearity effects" which plagued U.S. Pat. No. 3,654,606, and are described in U.S. Pat. No. 4,731,610, are inconsequential when configuration of U.S. Pat. No. 3,654,606 is utilized in a pulse width modulated mode. Apparently, by failing to recognize this fact, these modes of operation were not contemplated for use with U.S. Pat. No. 4,731,610 or similar configurations.

Configurations similar to U.S. Pat. No. 3,654,606 are quite complementary with my invention, including U.S. Pat. No. 4,731,610, because they eliminate electrical crossover networks, enhancing reliability.

FIG. 3 shows a schematic of an active matrix addressing configuration which is utilizable with my invention. A plurality of first electrodes 18 are arranged into a matrix of p rows and q columns. Each pixel element 44 contains a respective electrode 18 and a respective conductor 20. Every conductor 20 in each column q is electrically connected by a respective column buss 22. Every first electrode 18 is electrically connected by a suitable feedthrough means 32 to a respective third terminal 58 of a respective switching element 60. Each switching element 60 is a pair of thresholding devices, a respective first thresholding device 46 and a respective second thresholding device 48.

Every first thresholding device 46 in each row p is electrically connected to a respective first row select buss 50 by a respective first switch terminal 62. Every second thresholding device 48 in each row p is electrically connected to a respective second row select buss 52 by a respective second terminal 64. Every first buss 50 is parallel to each second buss 52. Every first thresholding device 46 and every second thresholding devices 48 can be any threshold device of the type which provides a high impedance to current flow when reversed biased and a comparatively low impedance to current flow when forward biased.

Threshold devices could take the form of diodes, and are coupled in a non-opposing series relation at the respective third terminal 58. A suitable potential control means to control the potential difference between each first electrode 18 and the respective conductor 20 includes a column driver block 54 and a row select address block 56. Operation of the suitable potential control means are well understood by those knowledgeable in the state of the art.

Physical construction of such a matrix configuration is in accordance with my invention. Conductors are affixable by a means to the first face of the substrate. Switching elements are affixable to the second face of the substrate by a means. First electrodes overlap the respective switching elements, and first electrodes are overlapped by the respective conductors. Each first row select buss is parallel to every second row select buss.

As well understood by those knowledgeable in the state of the art, thin film diodes are capable of being formed from thin film transistors. Accordingly, thin film components utilizable in my invention includes thin film diodes and thin film transistors.

FIG. 4 shows an alternative active matrix array configuration which is utilizable with my invention. Each first electrode 18 is electrically connected to a drain terminal 74 of a respective thin film transistor 76 by a feedthrough 32. Each transistor 76 is affixed to face 34 by a suitable means. As well understood by those knowledgeable in the state of the art, several vacuum deposition techniques are available to form the thin film transistors utilized in my invention. Such techniques include vacuum evaporation, electron beam evaporation, and sputtering. Accordingly, vacuum deposition represents a means to affix and/or form thin film transistors on the substrate of my invention.

Each first electrode 18 overlaps the respective transistor 76 thereby yielding a matrix of p rows and q columns of transistors 76. Each transistor 76 further includes a source electrode 78 and a gate electrode 80. A plurality of first busses 40 electrically connects every source electrode 78 in each row p to a common potential source. The common potential source is not shown in this figure. Every gate electrode 80 in each row p is electrically connected by a respective second buss 42. The second buss associated with the top row of transistors 76 is not shown in this figure for convenience. Each second buss 42 is parallel to every first buss 40. Having each first buss parallel to every second buss avoids electrical crossover networks in the active switch matrix. As well understood by those knowledgeable in the state of the art, avoiding electrical crossover networks enhances reliability and simplifies fabrication sequences associated with fabricating modulator 10.

Each first electrode 18 and the respective conductor 20 form an electrostatic deformable pixel element 44. A potential control means is provided to control the potential difference of each pixel element 44 so as to deform conductor 20 of the pixel 44 and/or vary the separation distance between each electrode 18 and the respective conductor 20 of the pixel in accordance with an information bearing signal, thereby modulating a wavefront incident on modulator 10. As well understood by those knowledgeable in the state of the art, depending upon the form implemented for the conductors 20, the modulation may be phase or amplitude dominant. The wavefront is not shown in this figure.

Potential control means are well understood by those knowledgeable in the state of the art. Each second buss is electrically connected to a row decoder module which applies a control signal to a selected second buss, changing the impedance state of every transistor connected by the selected second buss from a high impedance state to a low impedance state, enabling the potential difference of every pixel element in the selected row to be controlled by the potential difference between the common potential source and the potential applied to the respective column buss. The row decoder is capable of providing a random select capability or a consecutive sequence. Methods of establishing potentials on the respective column busses are well understood by those knowledgeable in the state of the art. Circuitry for performing these functions could be contained in modules which are capable of being bonded the substrate, or fabricated as thin film components to be affixed to the first face and/or the second face in an appropriate fabrication sequence relative to the fabrication of the shutter elements. Interface circuitry is described in the cited references, and is not shown. Pixels could be operated in an analog or in a pulse width modulated manner.

Transistors 76 shown in FIG. 4 utilize a coplanar electrode structure. Transistors 76 further includes a semiconductor layer 82 and a gate insulation layer 84. Information concerning the categorization of electrode structures is provided in the book titled "Field Effect Transistors: Physics, Technology and Applications" edited by Wallmark and Johnson, Prentice-Hall, 1966, chapter 9 titled "Thin Film Transistors" by Paul K. Weimer. In the coplanar electrode shown in FIG. 4, the level of metalization which includes gate electrodes 84, source electrodes 78, drain electrode 74 are initially deposited on the substrate followed by deposition of gate insulation layers 84 and then semiconductor layers 82. Deposition sequences for fabricating an active matrix array of thin film transistors, as a function of the electrode structure are identified in the references cited herein. In the coplanar electrode structure illustrated in FIG. 4, layer 84 and electrode 80 are disposed between substrate 12 and semiconductor layer 82 of the respective transistor 76. Forming the transistors on the substrate of my invention avoids extraneous components such as additional substrates and/or bonding operations. Furthermore, use of a no crossover matrix configuration avoids transferring crossover buss components to the interface requirements associated with the switching elements.

Summary, Ramifications, and Scope

Although the description above contains many specificities, these should not be construed as limiting the scope of the invention but merely providing illustrations of some of the presently preferred embodiments of my invention. For instance, several switching elements exists. As identified in the references provided herein, single-crystal films have been deposited on sapphire by hydrogen reduction of silicon tetachloride. Accordingly, thin film transistors includes single crystal silicon field effect transistors formed on an insulating substrate. Material layers for use with the thin film transistor of my invention include polycrystalline semiconductor material layers and single crystal semiconductor material layers.

Additional switching elements can be fabricated on an insulating substrate. See for instance information contained in the reference titled "The Future of Thin-Film Active Device" by Charles Feldman, Electronics, Jan. 24, 1964, and U.S. Pat. No. 4,731,610 to Baron et al Mar. 15, 1988. In addition, new transistor structures are being developed to serve a variety of applications. See the information in the article "Present and Future Applications of Amorphous Silicon and it's Alloys" by P. G. Comber, Journal of Non-Crystalline Solids 115 (1989) 1–13. Utilizing the information contained herein, several suitable switching elements may be utilized to realize the advantages of my invention. For instance, additional switching elements utilizable in my invention includes thin film varistors formed on the substrate.

Several means are utilizable to affix switching elements to the substrate of my invention. Means include affixing an insulating layer to the second face of the substrate. Such a layer could be phosphosilicate glass or silicon dioxide. Switching elements could be affixed to the exposed face of the insulating layer. The insulating layer is etched to establish feedthroughs to electrically connect to the feedthroughs in the modulator substrate. Use of an insulating layer affixed to the insulating substrate of the modulator, could allow finer dimensions to be achieved with feedthroughs etched in the insulating layer as compared to the modulator substrate. This allows the switching elements to overlap respective feedthroughs in the modulator substrate with out shorting the switching elements. This technique enhances spatial resolution of the modulator.

Use of the insulating layer disposed between the modulator substrate and the switching elements, to assist in affixing switching elements to the substrate, expands material options available for, and the type of, switching elements utilized in the matrix configuration. These considerations are well understood by those knowledgeable in the state of the art, and are available for consideration in my invention due to the flexibility inherent in my invention. Examples include laser-induced crystallization of silicon islands affixed to the second face.

As previously identified, several active switch matrix addressing configurations are utilizable with my invention. Although a no crossover matrix configuration provides additional advantages, it does no infer that a matrix configuration with crossovers is precluded from use in my invention. This is important because it is believed that no thin film matrix addressing configuration affixed to the modulator substrate has been proposed for use with electrostatic light modulators.

Accordingly, the potential control means to control the potential difference between each first electrode and the respective conductor is expanded in definition to include a means to electrically the source and/or drain and gates electrodes of each thin film transistor in a manner consistent with the desired matrix configuration. A matrix configuration containing crossovers is described as a "field effect transistor capacitor" addressed configuration of FIG. 13 in the article "Liquid Crystal Displays". Potential control means include a plurality of first terminal column electrodes to electrically connect every source electrode in each column to a respective column electrode voltage source (identified as C1, C2, etc. in FIG. 13). The potential control means further includes a means to hold each column buss at a respective fixed potential (identified as ground potential in FIG. 13). Potential control means further includes electrically connecting every gate electrode in each row by a respective row buss. A row of transistors is selected as previously described (as row pulse generators in FIG. 13), and the drain electrode of each transistor in the selected row is charged to a potential related to the value of the respective column electrode voltage source. This procedure is repeated for each row of pixel elements in the modulator.

When affixing first electrodes to the substrate, first electrodes could be recessed from the first surface and embedded in the substrate. Such techniques represents a means to affix first electrode to the substrate. Affixing first electrodes by recessing first electrodes from the first face provides several benefits. The functionality of the substrate could be increased by allowing the substrate to function as an insulating landing area for certain deformable conductor geometries. Increasing the functionality of the substrates reduces fabrication complexities, and thereby enhances yield. Recessing first electrodes from the first face further avoids electrical shorts involving certain conductor configurations when landing on the insulating substrate. Utilization of backside electronics avoids the requirement of extraneous light blocking components, since the substrate could perform this function, further increasing it's functionality.

As can be seen, several benefits are available with my invention. Accordingly, the scope of my invention should be determined not by the embodiments illustrated, but by the appended claims and their legal equivalents.

I claim:

1. An electrostatic spatial light modulator comprising:
   an insulating substrate,
   a capacitive pixel element comprising:
   first electrode means affixed to said substrate,
   reflective conductor means affixed to said substrate overlapping and separated from said first electrode means,
   a thin film switching element formed on said substrate,
   said thin film switching element comprises a first terminal, a second terminal, a third terminal,
   said first terminal of said thin film switching element is electrically connected to said pixel element,
   potential control means for applying to said pixel element a potential difference comprising:
      means operatively associated with said control means electrically connected to said second terminal of said thin film switching element to enable said potential difference to be dependent on a potential applied to said third terminal of said thin film switching element,
   whereby varying said potential difference varies separation between said reflective conductor means and said first electrode means of said pixel element thereby modulating a wavefront incident on said reflective conductor means.

2. The device of claim 1 wherein said thin film switching element is a thin film transistor.

3. An electrostatic spatial light modulator comprising:
   an insulating substrate,
   a plurality of pixel elements, each said pixel element comprising:
      first electrode means affixed to said substrate,
      reflective conductor means affixed to said substrate overlapping and separated from said first electrode means,
   a plurality of thin film electronic switching element formed on said substrate,
   each said thin film electronic switching element comprises a first terminal, a second terminal, a third termina,
   said first terminal of each said thin film electronic switching potential control means including said thin film electronic switching elements for applying to each said pixel element a respective potential difference which is dependent upon a first potential applied to said third terminal of said thin film electronic switching element electrically connected to said pixel element,
   means operatively associated with said potential control means varying said potential differences which varies separation between said reflective conductor means and said first electrode means of the pixel element thereby modulating a wavefront incident on said reflective conductor means of said pixel element.

4. The device of claim 3 wherein each said thin film electronic switching element is a thin film transistor.

5. An electrostatic spatial light modulator comprising:
   an insulating substrate,
   first electrode means affixed to said substrate,
   reflective conductor means affixed to said substrate overlapping and separated from said first electrode means to form a plurality of pixel elements,
   electrically connected to each said pixel element is a first terminal of a respective thin film electronic switch formed on said substrate,
   each said thin film electronic switch comprises a second terminal and a third terminal,
   potential control means to apply to each said pixel element a respective potential difference comprising:

means operatively associated with said control means electrically connected to said second terminal of each said thin film electronic switch to enable said potential difference applied to each said pixel element to be dependent on a potential applied to said third terminal of said thin film electronic switch electrically connected to said pixel element, whereby varying said potential difference applied to each said pixel element varies separation between said reflective conductor means and said first electrode means of said pixel element thereby modulating a wavefront incident on said reflective conductor means of said pixel element.

6. The device of claim 5 wherein each said thin film electronic switch is a thin film transistor.

* * * * *